3,478,609
BELT DRIVE
Lucian J. Beindorf, Springfield, Mo., assignor to Dayco Corporation, Dayton, Ohio, a corporation of Delaware
Filed Dec. 26, 1967, Ser. No. 693,378
Int. Cl. F16h 7/00
U.S. Cl. 74—229                                   5 Claims

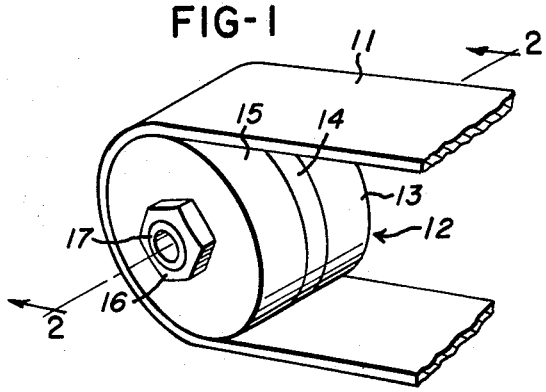
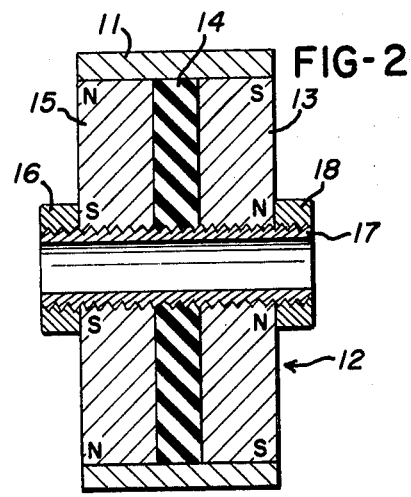
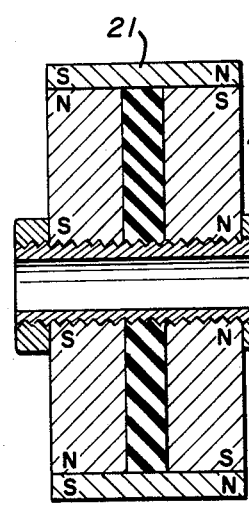
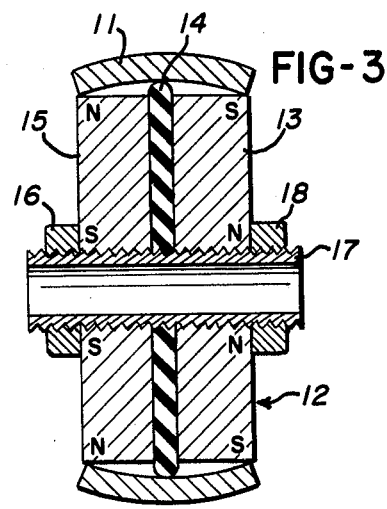
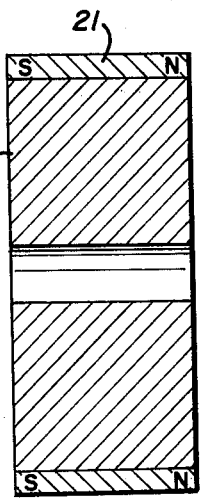
INVENTOR
LUCIAN J. BEINDORF
BY Reuben Wolk
ATTORNEY United States Patent Office 3,478,609
Patented Nov. 18, 1969

ABSTRACT OF THE DISCLOSURE

A magnetic belt drive having a pulley with insulated magnetized halves of opposite polarity, and a ferrous or ferrous-loaded rubber belt which is magnetic and may be magnetized. As a variation, a magnetized belt may be used with a magnetic but non-magnetized ferrous pulley.

---

The present invention relates to a belt drive of the type utilized for transmitting power from one rotary member to another.

Conventional belt drives consist of grooved pulleys and rubber V-belts which transmit the power. One of the pulleys is the driving member and the other is the driven member. These drive systems depend for operation on frictional engagement between the lateral surfaces of the belt and the inner surfaces of the grooves of the pulleys. The purpose of the present device is to increase the coefficient of friction between the belt and the pulley in order to reduce the slippage and increase the efficiency of power transfer between the belt and pulley, while at the same time providing flatter entrance and exit angles between the pulley and the belt. This increases the life of the belt, reduces the amount of heat generated, and reduces the noise in the transmission system.

In the conventional V-type belt the increased loading on the belt provides an additional wedging effect of the belt and the pulley, and while power is efficiently transmitted, it has been found necessary to make the belt thicker in order to prevent turnover and to provide enough surface to compensate for the increased wear. The increased thickness, however, in turn causes great internal stresses where the belt bends around the pulley, thus generating heat within the belt and heat between the belt and the pulley, due to a constant wedging action when the belt enters the pulley and a tendency to recover when leaving the pulley. It is, therefore, highly important that the entrance and exit angles be small, and the belt thickness be reduced where possible in order to minimize heat and wear. Unfortunately, this cannot be done with conventional V-belts. The present invention, however, offers a drive system whereby the wedging action is replaced by a magnetic interaction between the belt and pulley. More specifically, this may be done by making a flat belt and a cylindrical pulley without grooves so that the belt simply rides over the surface of the pulley and depends upon magnetic fields for adherence between the belt and pulley. According to the present invention this may be done by any of the following arrangements:

(1) A magnetized pulley in which each side of the pulley consists of a magnet of opposite polarity, in combination with a magnetic metal belt.

(2) The same combination as above, except that in lieu of a metal belt the belt may be made of rubber having ferrous powder incorporated therein, or a thin metal band coated with rubber.

(3) The same magnetized pulley as described above, except that the belt may also be magnetized in such a manner that the poles of the pulley are adjacent opposite poles in the belt. This belt may also be either metal, rubber having ferrous powder, or a thin metal band coated with rubber.

(4) A magnetized belt formed of steel or rubber having ferrous particles, used in conjunction with a ferrous pulley which is not magnetized.

It should be understood that the term "magnetized" as used herein refers to a member which has been formed into a magnet capable of exerting a field. The term "magnetic" refers to a material which is capable of becoming magnetized or is attracted to or repelled by a magnet. The term "rubber" refers to natural or synthetic rubbers, including urethane rubbers.

An attempt to create a similar drive is described by Baermann in his Patent No. 3,208,296, in which the inventor utilized a plurality of north and south poles alternately spaced around the pulley in a peripheral direction, with similar north and south poles in the belt also alternating in a longitudinal direction to match and synchronize the poles in the pulley. In accordance with my findings, it would be difficult to synchronize these poles while the belt is in operation because even a slight slippage or change in diameter would cause the opposite poles of the belt and pulley to become unsynchronized. When this occurs, there is a magnetic repulsion which forces the belt away from the pulley and causes additional slippage. The end result is a series of attractions and repulsions which creates wear and fibration in the belt drive. In addition, it is obvious that such a construction is highly expensive.

The present invention represents a considerably improvement over the prior art device because it is much easier to manufacture and can tolerate a certain amount of slippage or variation because of the use of the single pole on each side of the pulley. Thus, even with a slight variation the same amount of magnetic pull would continue to exist. The pulleys according to my invention can be economically made in any size and will eliminate any problem of close matching between the pulley and the belt.

Since the belt can be very thin due to the surface attraction, the high degree of flexing and bending and the large exit and entrance angles will be eliminated, and thus the belt life would be considerably improved. In addition, there is a tendency for the belt to tighten at the entrance of the pulley because of the small entrance and exit which thus further increases the life of the belt and tendency to eliminate slippage in the members. The present combination further has the advantage of minimizing wear on the pulley surfaces which may be a hard metal. Another advantage of the present system lies in the tendency for the belts to retain a constant tautness on the pulley when the drive is not operating; this also minimizes any slight amount of pulley misalignment.

These and other features of the device are illustrated in the drawings, in which:

FIGURE 1 is a perspective view of a novel belt drive.

FIGURE 2 is a sectional view taken along lines 2—2 of FIGURE 1.

FIGURES 3, 4 and 5 are views similar to FIGURE 2, illustrating modified forms of the invention.

Referring now to the drawings, FIGURES 1 and 2 illustrate a preferred form of the invention in which a thin flat belt 11 is shown passing over the surface of the pulley 12. The pulley consists of two halves 13 and 15 which are made of cast or pressed steel, iron or Alnico, or sintered or cast ceramic materials. The material is magnetized so that each half is of opposite polarity. Separating the halves 13 and 15 is a rubber or other nonmagnetizable spacer 14 which avoids short circuiting the flux which flows through the assembly. The pulley halves and spacer are mounted on a steel central shaft 17 and are retained by means of nuts 16 and 18 which are threaded onto the shaft 17 in a conventional manner. The assembly is held in place by conventional means such as set screws, locking rings, etc., which are not illustrated since they are not important to the present invention.

The operation of the drive is very simple: as the metal belt 11 passes over the pulley assembly 12 it is held in place on the surface by virtue of the flux field which flows through one pulley half, through the belt, back through the other pulley half, and through the central mounting shaft.

Instead of manufacturing the belt 11 of steel as described above, it may also be fabricated of rubber and magnetic powder such as barium-ferrite powder, which is mixed into the rubber to render it capable of transmitting the flux from the magnetized pulley, or may be a thin steel band coated with rubber that has been applied by spraying or dipping. The rubber coating should be thick enough to withstand wear and provide a positive drive, but thin enough to permit efficient transmission of the magnetic flux.

FIGURE 3 illustrates a variation of the invention in which the belt 11 may be operated with a slight crown in order to provide additional friction and to improve the tendency of the belt to center on the pulley. This is accomplished by simply tightening the nuts 16 and 18 on the central shaft 17 to squeeze the spacer 14 and cause it to bulge outwardly as shown. This effectively increases the diameter of the center of the pulley so that the belt will then ride in the crowned fashion illustrated.

FIGURE 4 illustrates a further form of the invention in which the pulley 12 is used in combination with a belt 21 in place of the belt 11. The belt 21 is a steel band, a rubber-coated steel band, or a rubber having magnetic powder. In this case the belt has actually been magnetized so that it also in effect becomes a magnet. Each lateral portion of the belt is of opposite polarity. The belt is mounted on the pulley in such a manner that the south pole of the belt is opposite the north pole of the adjacent pulley half, while the north pole of the belt is adjacent the south pole of the other pulley half. The flux is passed in a somewhat similar manner to that previously described. In this case each lateral portion of the belt is of opposite polarity.

Still another form of the invention is illustrated in FIGURE 5 in which the magnetized belt 21 just described is operated in conjunction with a steel pulley 22 which is formed of magnetic material but not magnetized. Again, each lateral portion of the belt is of opposite polarity. The magnetic attraction, therefore, is similar to that previously described, except that it is the belt rather than the pulley which is a magnet.

It can be seen that regardless of the specific configuration described herein, the pulley and belt will have a magnetic attraction to each other in which the principal characteristics involve an opposite polarity in either pulley or belt, or both, in a direction which is transverse of the belt. The magnet may be said to be continuous in the transverse portion.

Other modifications may be made without departing from the scope of the invention.

I claim:
1. A belt drive comprising a pulley and an endless transmission belt, the inner surface of said belt engaging the outer periphery of said pulley, said pulley comprising two magnetized sides of opposite polarity and having a flexible spacer between the two sides thereof, and said belt containing a magnetic material.

2. The belt drive of claim 1 in which said spacer extends radially outward of said pulley sides, said belt assuming a crowned configuration while passing over said pulley.

3. A belt drive comprising a pulley and an endless transmission belt, the inner surface of said belt engaging the outer periphery of said pulley, said belt comprising a magnet with each lateral portion being of opposite polarity, said pulley containing a magnetic material.

4. The belt drive of claim 3 in which said pulley comprises two magnetized sides of opposite polarity.

5. The belt drive of claim 4 in which each side of said pulley and its contacting belt side are of opposite polarity.

References Cited

UNITED STATES PATENTS

| | | | |
|---|---|---|---|
| 493,858 | 3/1893 | Edison | 74—229 |
| 996,022 | 6/1911 | Lindhard | 74—229 |
| 2,655,195 | 10/1953 | Curtis | 74—232 |
| 2,748,044 | 5/1956 | Seiler | 74—232 |
| 3,179,240 | 4/1965 | Kain | 74—232 XR |
| 3,208,296 | 9/1965 | Baermann | 74—229 |

FOREIGN PATENTS

| | | |
|---|---|---|
| 203,370 | 9/1956 | Australia. |

FRED C. MATTERN, Jr., Primary Examiner

JAMES A. WONG, Assistant Examiner